United States Patent [19]

Wakabayashi

[11] Patent Number: 5,734,423
[45] Date of Patent: Mar. 31, 1998

[54] SIGNAL HYBRID DEVICE

[75] Inventor: Toshitsugu Wakabayashi, Tokyo, Japan

[73] Assignee: Mitsubishi Denki Kabushiki Kaisha, Tokyo, Japan

[21] Appl. No.: 634,557

[22] Filed: Apr. 18, 1996

[30] Foreign Application Priority Data

Jan. 23, 1996 [JP] Japan ................... 8-009586

[51] Int. Cl.$^6$ ........................................ H04N 17/00
[52] U.S. Cl. ................... 348/189; 348/190; 348/569
[58] Field of Search ........................ 348/569, 180, 348/190, 189, 563

[56] References Cited

U.S. PATENT DOCUMENTS 3,962,722  6/1976  Ciciora ........................... 348/190
4,858,006  8/1989  Suzuki et al. .................... 348/189
5,371,537  12/1994  Bohan et al. .................... 348/190

FOREIGN PATENT DOCUMENTS 6-105185  4/1994  Japan.
6-105346  4/1994  Japan.

*Primary Examiner*—Victor R. Kostak
*Attorney, Agent, or Firm*—Burns, Doane, Swecker & Mathis, LLP

[57] ABSTRACT

A signal hybrid device has a first dual gate FET 7 having input control terminals for receiving and hybridizing a video signal transmitted through an input terminal 19 and a blank signal from an OSD 5 through one of the input control terminals, a second dual gate FET 8 having input control terminals for receiving and hybridizing a DC control voltage from a voltage power source and a video signal from the OSD 5 through one of the input control terminals, and a CRT driver 4 for supplying the hybrid video signal generated by the first and second dual gate FETs 7 and 8.

6 Claims, 5 Drawing Sheets

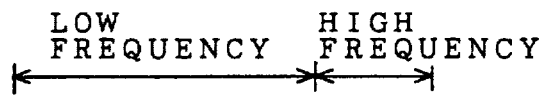
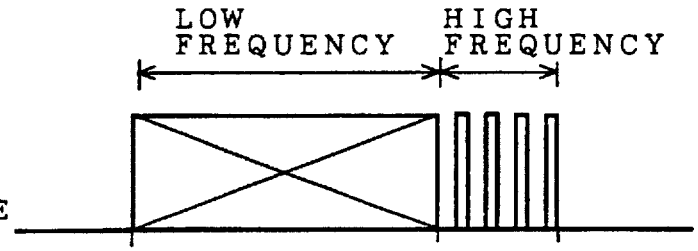
FIG. 2A
a NODE
FIG. 2B
b NODE
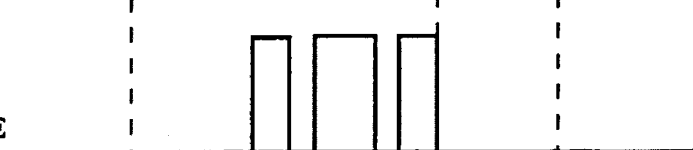
FIG. 2C
c NODE
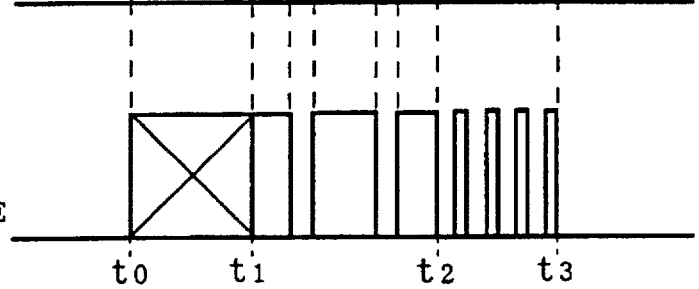
FIG. 2D
d NODE
$t_0 \quad t_1 \quad t_2 \quad t_3$
CHANGE CAUSED
BY D/A CONVERTER
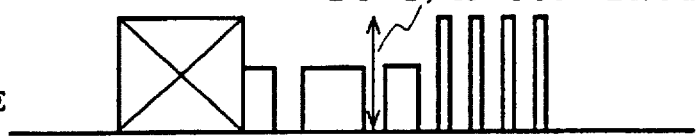
FIG. 2E
d NODE
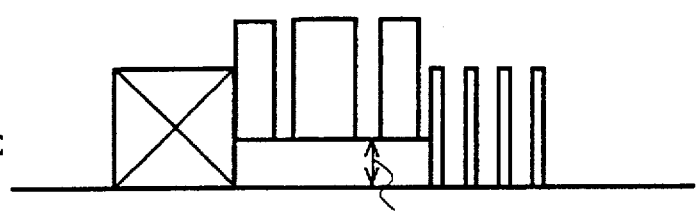
FIG. 2F
d NODE
CHANGE CAUSED BY DC
VOLTAGE VARIABLE MEANS
FIG. 2G

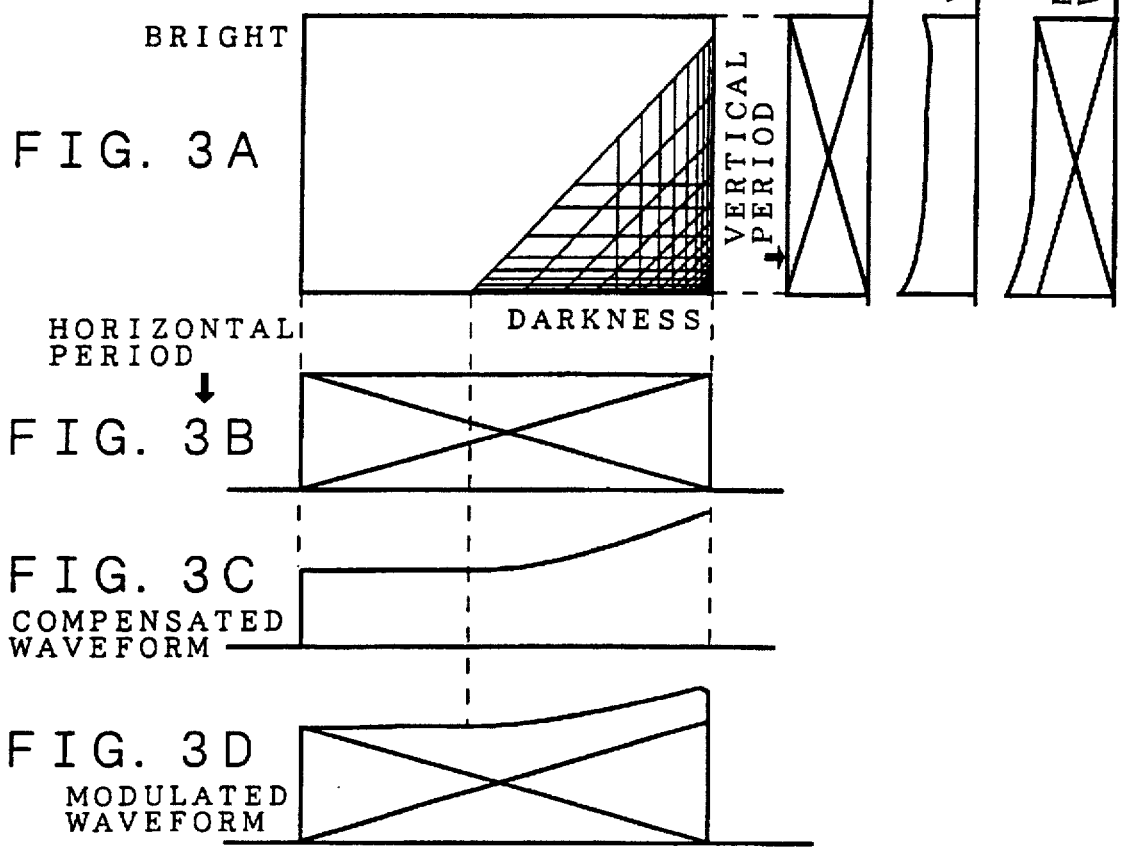

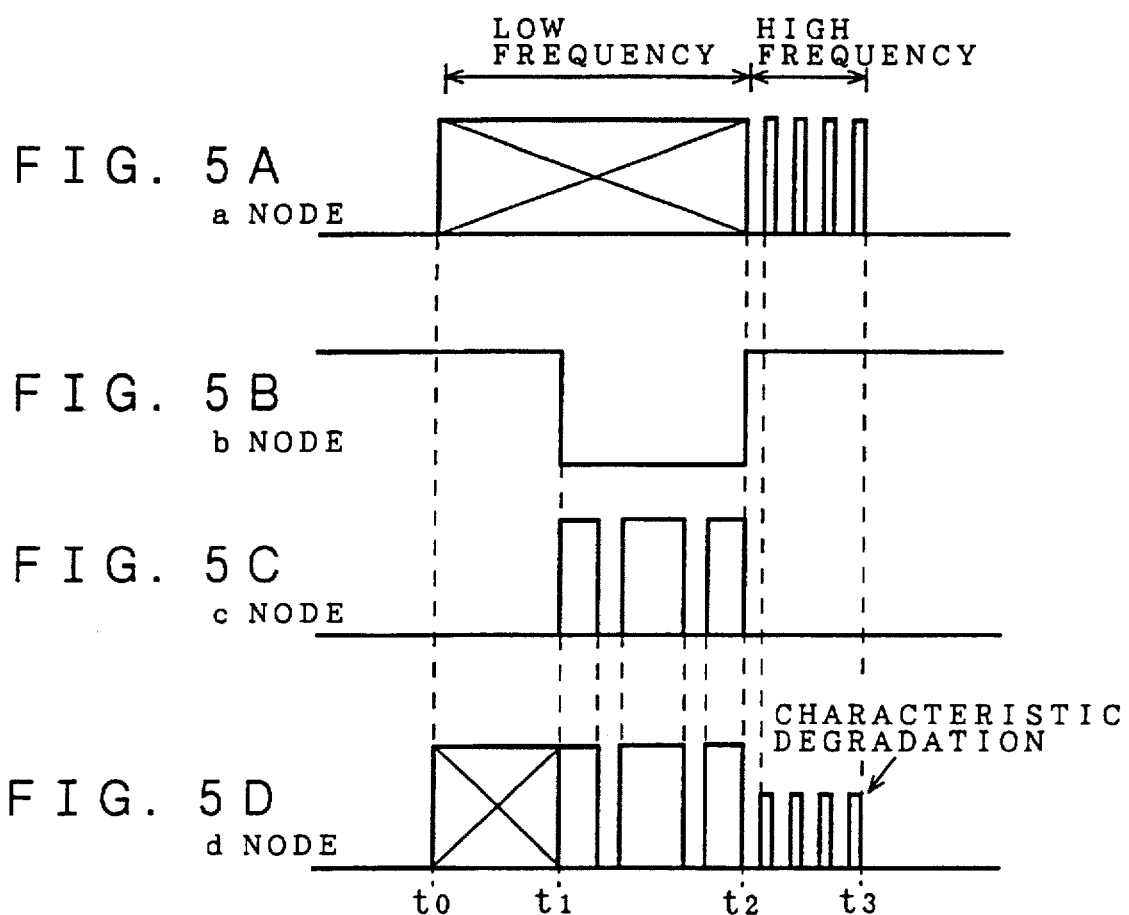

1

SIGNAL HYBRID DEVICE

BACKGROUND OF THE INVENTION

1. Field of the Invention

The present invention relates to a signal hybrid circuit used for a hybridization and a white uniformity compensation operation between a video signal and a signal transmitted from a On Screen Display (hereinafter referred to as "OSD") in a display device and the like.

1. Description of the Prior Art

FIG. 4 is a circuit diagram showing a conventional signal hybrid device. In FIG. 4, a reference number 41 designates an applied terminal (or input terminal) of a voltage Vcc1, 42 denotes an applied terminal of a voltage Vcc2, 419 denotes an input terminal through which Red (R), Green (G) and Blue (B) video signals are supplied from outside of the signal hybrid device, 410 designates a Alternating Current (AC) coupling condenser connected between the input terminal 419 and an amplifier 43 (a Pre-amplifier), and 413 designates a load resistor connected to an output terminal of the amplifier 43. In addition, a reference number 45 designates an OSD, 433, 434 and 435 denote transistors forming a mixing circuit M. The base of the transistor 433 is connected to the output terminal of the amplifier 44, the base of the transistor 435 is connected to a blank signal output terminal 421 of the OSD 45, and the base of the transistor 416 is connected to a video signal output terminal 422 of the OSD 45, respectively. A reference number 44 designates a Cathode Ray Tube (CRT) driver for driving a CRT (not shown) by amplifying the output signal from the mixing circuit M, and reference numbers 414 and 416 denote resistors.

FIGS. 5A to 5D show signal waveform diagrams of parts of the conventional signal hybrid device as shown in FIG. 4. In FIGS. 5A to 5D, FIG. 5A shows a video signal waveform at the point or node "a" of the output side of the amplifier 43. FIG. 5B shows a blank signal waveform at the point or node "b" of the output side of the OSD 45. FIG. 5C shows the video signal waveform at the point or node "c" of the output side of the OSD 45. FIG. 5D shows the output signal waveform at the point or node "d" of the output side of the mixing circuit M.

Next, the operation of the conventional signal hybrid device as shown in FIG. 4 will be explained. In the following explanation, although the R, G and B video signals are described as being supplied to the input terminal 419 for brevity, in fact, a input terminal 419 is used for each of the R, G and B video signals, namely the signal hybrid circuit as shown in FIG. 4 is used for each of the R, G and B video signals.

First, the R, G and B video signals applied to the input terminal 419 are transmitted to the amplifier 43 through the AC coupling condenser 410 and then transformed signals having desired amplitudes, respectively. The output waveform from the amplifier 43 has a low frequency waveform and a high frequency waveform. Here, the low frequency waveform means a video signal of a lower repeated frequency (having a longer time period) such as a full white signal and the high frequency waveform means a video signal of a higher repeated frequency (having a shorter time period) such as ON and OFF of one dot.

During the time period t0 to t1 (the video signals are not transmitted from the OSD 45, namely OFF) as shown in FIGS. 5A to 5D, because the level of the blank signal output terminal 421, namely the level at the node b of the OSD 45 is a high level as shown in FIG. 5 and the level of the video signal output terminal 422, namely the level of the node c is a low level as shown in FIG. 5C, both of the transistors 433 and 435 are ON and the transistor 434 is OFF and the R, G and B video signals are transmitted to the input terminal of the CRT driver 44 as shown in FIG. 5D.

On the other hand, during the time period t1 to t2 (the video signals are transmitted from the OSD 45, namely ON), because the level of the blank signal output terminal 421 of the OSD 45 is the low level as shown in FIG. 5B and the level of the video signal output terminal 422 of the OSD 45 is the high level, the transistors 433 and 435 are OFF, the transistor 434 is ON and the OSD video signal from the OSD 45 is transmitted to the input terminal of the CRT driver 44 as shown in FIG. 5D.

In addition, during the time period t2 to t3 as shown in FIGS. 5A to 5D, when the R, G and B video signals of a high frequency are supplied to the input terminal 419, the output signal waveform from the mixing circuit M which has been transmitted to the CRT driver 44 through the AC coupling condenser 410, the amplifier 43 and the mixing circuit M can be shown in FIG. 5D. In this case, the qualities of these R, G and B video signals become bad, namely these are degraded with high frequency characteristics because these R, G and B video signals are affected by capacities between the terminals of the transistors 434 and 435.

In addition, there are techniques described in Japanese Laied-open Patent Application No. 6-105185 (Tokkai-Hei 6-105185) and No. 6-105346 (Tokkai-Hei 6-105346) as prior art techniques.

Because the conventional signal hybrid device has the configuration described above, degradation of the high frequency characteristics of the R, G and B video signals and a phase delay in the OSD video signal 15 caused or happens. In addition, because the mixing circuit M is used as a switch, the mixing circuit M can not execute adjustment of the amplitude of the OSD video signals and adjustment of level of the Direct Current (DC). Moreover, it is difficult to add this function to the mixing circuit M in order to modulate the R, G and B video signals in a horizontal direction and a vertical direction. These are problems.

SUMMARY OF THE INVENTION

This invention is invented in order to solve the above-mentioned problems or drawbacks of the conventional signal hybrid device as described above.

An object of the present invention is to provide a signal hybrid device which is capable of hybridizing OSD video signals and adjusting the amplitude and level of the direct current of R, G and B video signals without any degradation of the high frequency characteristic of the R, G and B video signals.

Another object of the present invention is to provide a signal hybrid device which is capable of performing a white uniformity compensation by modulating R, G and B video signals in a horizontal direction and vertical direction.

In accordance with a preferred embodiment of the present invention, there is provided a signal hybrid device comprising: a first active element having a plurality of input control terminals which being independently to each other through which a video signal transmitted from outside and a blank signal from an OSD and for hybridizing said video signal with blank signal; and a second active element having a plurality of input control terminals which being independently to each other through which a DC control voltage from a voltage power source and said OSD video signal from said OSD and for hybridizing said DC control voltage with said OSD video signal. An output means transmits said hybrid signals hybridized by said first active element and said second active element in order to drive a CRT.

In addition, in the signal hybrid device described above, said voltage power source generates said DC control voltage whose voltage level being changeable.

Furthermore, the signal hybrid device described above further comprises a direct current voltage changeable means for supplying a direct current voltage having a optional voltage level to said input control terminals of said second active element to which said OSD video signal being transmitted from said OSD.

Moreover, the signal hybrid device described above further comprises: detection means for detecting a brightness and a color balance of a picture displayed on a monitor for receiving said hybrid signal from said output means and for displaying said received hybrid signal; compensation data generation means for generating compensation data based on said brightness and the color balance of the picture detected by said detection means; and compensation voltage generation means for generating white uniformity compensation voltages in a horizontal period and a vertical period based on said compensation data and for supplying said white uniformity compensation voltages to said input control terminal of said first active element to which said blank signal being transmitted.

In addition, in the signal hybrid device described above, each of said first active element and said second active element is a dual gate field effect transistor, respectively.

Moreover, in the signal hybrid device described above, said voltage power source is a digital-analogue converter.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 2A to 2G are signal waveform diagrams of circuit elements of the signal hybrid device as shown in FIG. 1.

FIGS. 3A to 3G are timing charts showing a white uniformity compensation operation performed by the signal hybrid device as shown in FIG. 1.

FIGS. 5A to 5D are signal waveform diagrams of circuit elements of the conventional signal hybrid device as shown in FIG. 4.

DESCRIPTION OF THE PREFERRED EMBODIMENTS

Hereinafter, preferred embodiments of the present invention will be explained with reference to drawings.

First Embodiment

Figure 1:
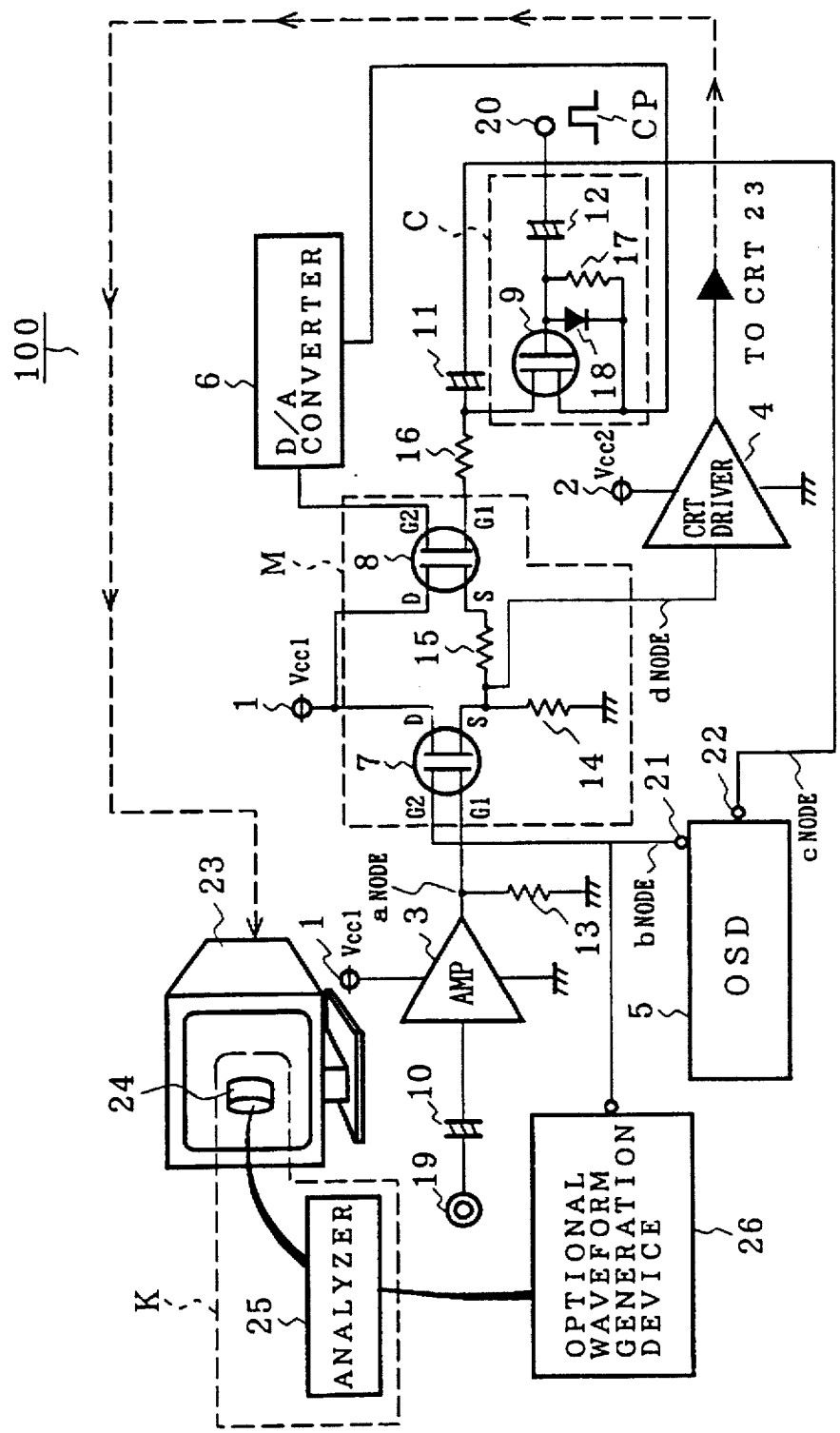
FIG. 1 is a circuit diagram showing a signal hybrid device of a first embodiment according to the present invention.
Figure 4:
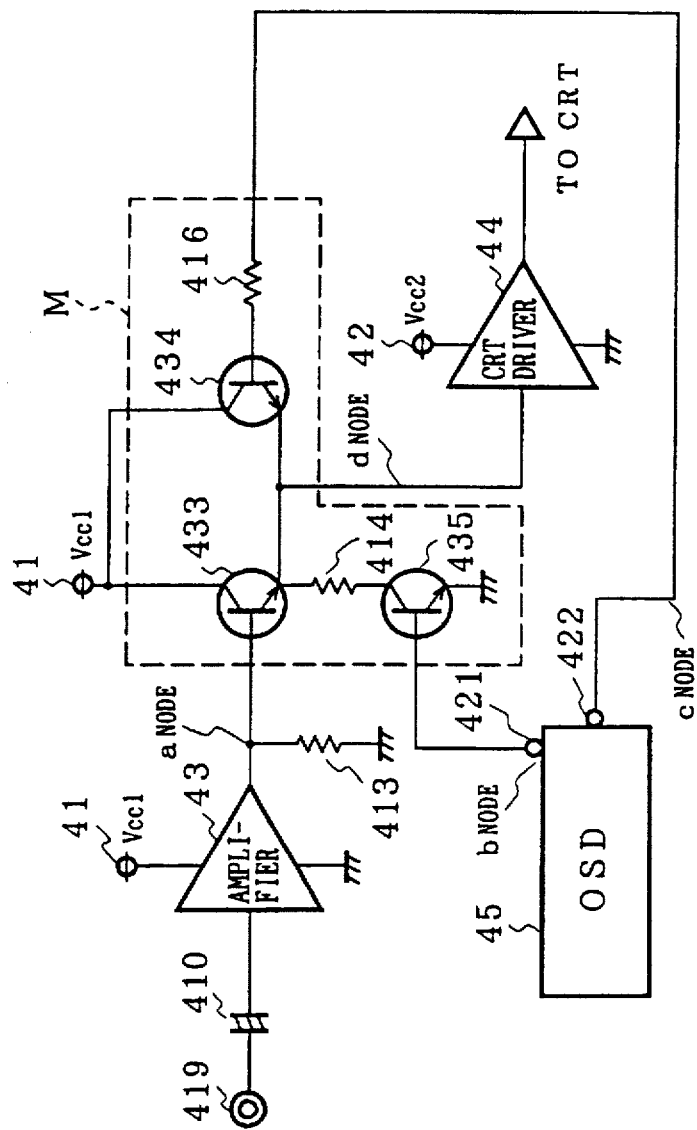
FIG. 4 is a circuit diagram showing a conventional signal hybrid device.

FIG. 1 is a circuit diagram showing a signal hybrid device 100 as the embodiment 1 according to the present invention. In FIG. 1, a reference number 1 designates an applied terminal (or input terminal) of a power source voltage Vcc1, 2 denotes an applied terminal of a power source voltage Vcc2, 19 denotes an input terminal through which one of Red (R), Green (G) and Blue (B) video signals is supplied from outside to the signal hybrid device 100, 10 designates a Alternating Current (AC) coupling condenser connected between the input terminal 19 and an amplifier 3 (a Pre-amplifier), and 13 designates a load resistor connected to an output terminal of the amplifier 3. In addition, a reference number 5 designates an On Screen Display (hereinafter referred to as OSD), 7 and 8 denote dual gate Field Effect Transistors (FETs) (or a first active element and a second active element, respectively) forming the mixing circuit M. A first gate G1 of each of the dual gate FETs 7 and 8 is an input control terminal through which video signals are received, a second gate G2 of each of the dual gate FETs 7 and 8 is an input control terminal, and 14 to 17 designate resistors. In addition, a condenser 12, a resistor 17, an FET 9 and a Digital/Analogue (D/A) converter 6 which generates a reference voltage forms a Direct Current (DC) clamp circuit C as a DC voltage variable means. A clamp pulse having a rectangular wave which is in synchronization with a horizontal period is supplied to an input terminal 20 of the clamp circuit C.

The clamp pulse CP is different from the blank signal in phase in order to clamp the DC level of the OSD video signal so that any change in the OSD video signals in DC level is caused. A reference number 6 designates the D/A converter as a voltage power source generating a DC control voltage in order to change the amplitude and the DC level of the OSD video signals to desired or required levels. A reference number 23 denotes a monitor driven by the output from the CRT driver 4 as the output means, 24 denotes a camera as a detection means to detect a brightness and a color balance of a picture displayed on the monitor 23, and 25 designates an analyzer as a compensation data generation means to generate a compensation data item after comparing detected pictures from the camera 24 with a picture stored in a reference table. A reference number 26 designates an optional waveform generation device as a compensation voltage generation means comprising gate arrays (hereinafter referred to as G/A). This optional waveform generation device 26 generates a white uniformity compensation voltage based on the compensation data item transmitted from the analyzer 25.

Although the signal hybrid device 100 shown in FIG. 1 which is used for one of R, G and B video signals, in fact, the signal hybrid device is incorporated within a display system (not shown) for each of R, G and B video signals. In this explanation of the first embodiment, only one of the signal hybrid devices for R, G and B video signals is shown for brevity, because these signal hybrid devices for R, G and B video signals are same in operation and configuration.

FIGS. 2A to 2G show signal waveforms of circuit elements in the signal hybrid device 100 as shown in FIG. 1 described above. In FIGS. 2A to 2G, FIG. 2A shows a waveform of a video signal at the node "a" as the output side of the amplifier 3. FIG. 2B shows a waveform of a blank signal at the node "b" as the output side of the OSD 5. FIG. 2C shows a waveform of a video signal at the node "c" as the output side of the OSD 5. FIG. 2C shows a waveform of an output signal of the mixing circuit M. FIG. 2E shows a waveform of the signal when the amplitude of the OSD video signal is changed by the DC control voltage supplied from the D/A converter 6. FIG. 2F shows a waveform of a signal when the DC level of the OSD video signal is changed by the DC voltage supplied from the DC clamp circuit C based on the clamp pulse (see FIG. 2G) supplied to the input terminal 20.

Next, the operation of the signal hybrid device 100 as shown in FIG. 1 will be explained.

In FIG. 1, the R, G and B video signals transmitted to the input terminal 19 are provided to the amplifier 3 through the AC coupling condenser 10 and then converted to the video signals having optional amplitude (see FIG. 2A).

During the time period t0–t1 (no video signal is transmitted from the OSD 5) as shown in FIGS. 2A to 2G, because the level of the blank signal output terminal 21 in the OSD 5 is the high level (see FIG. 2B) and the level of the gate G2 of the dual gate FET 7 is biased to the high level, the dual gate FET 7 operates as a buffer and picture waveforms are transmitted as the R, G and B video signals from the source of the dual gate FET 7.

On the other hand, because the level of the video signal output terminal 22 in the OSD 5 is the low level and the gate G1 of the dual gate FET 8 is connected to the OSD video signal output terminal 22, the dual gate FET 8 do not operate, namely it is OFF, only the R, G and B video signals are supplied to the input terminal of the CRT driver 4.

In addition, during the time period t1–t2 (video signals from the OSD 5 are transmitted) as shown in FIGS. 2A to 2G, because the level of the blank signal output terminal of the OSD 5 becomes the low level and this low level is supplied to the gate G2 of the dual gate FET 7, the the dual gate FET 7 is cut off, namely becomes OFF, and no R, G and B video signals are transmitted through the source of the dual gate FET 7.

On the other hand, the OSD video signals (see FIG. 2C) are transmitted through the video signal output terminal 22 of the OSD 5 and the condenser 11 to the gate G1 of the dual gate FET G8. At this time, because the DC control voltage from the D/A converter 6 is supplied to the gate G2 of the dual gate FET G8, the dual gate FET G8 performs and only the OSD video signals are supplied to the input terminal of the CRT driver 4 (see FIG. 2D).

In addition, during the time period t2–t3 shown in FIGS. 2A to 2D, the output of the mixing circuit M to be transmitted to the input terminal of the CRT driver 4 can be shown by the time period t2–t3 in FIG. 2D when the R, G and B video signals of the high frequency are received through the input terminal 19 to the signal hybrid device 100.

As described in detail, by using the signal hybrid device 100 of the first embodiment, because the mixing circuit M comprises active elements having a rapid response and a smaller capacity between terminals themselves, R, G and B video signals can be hybridized with OSD video signal with high accuracy without a degradation of the high frequency characteristic of each of the R, G and B video signals.

Second Embodiment

Next, the signal hybrid device as a second embodiment of the present invention will be explained.

In the signal hybrid deice 100 as shown in FIG. 1, the amplitude of the OSD video signal transmitted from the mixing circuit M can be changeable, like during the time period t1–t2 as shown in FIG. 2E, by supplying the voltage of an optional voltage level from the D/A converter 6 to the gate G2 of the dual gate FET 8.

As described above, in the signal hybrid device of the second embodiment of the present invention, high quality pictures can be displayed on a screen such as a CRT when the amplitude of the OSD video signals to be hybridized with the R, G and B video signals are changeable.

Third Embodiment

Next, the signal hybrid device as a third embodiment of the present invention will be explained.

In the signal hybrid deice 100 as shown in FIG. 1, the DC level of the OSD video signals transmitted from the DC clamp circuit C can be changeable, like the case during the time period t1–t2 as shown in FIG. 2F, by changing the voltage level of the control voltage supplied from the D/A converter 6, because the OSD video signals from the OSD 5 is clamped with an optional voltage level by the DC voltage supplied from the DC clamp circuit C to the gates G1 and G2 of the dual gate FET 8

As described above, in the signal hybrid device of the third embodiment of the present invention, when the DC level of the OSD video signals are changeable, high quality pictures can be displayed on a screen such as a CRT.

Fourth Embodiment

Next, the signal hybrid device as a preferred fourth embodiment of the present invention will be explained.

FIGS. 3A to 3G are timing charts showing a white uniformity compensation operation executed by the signal hybrid device 100 as shown in FIG. 1. In FIGS. 3A to 3G, FIG. 3A shows a display window of the monitor 23. In FIG. 3A, oblique lines at the corner of the right side designate the occurrence of a shade difference, color shading, color fades and so on.

FIG. 3B shows R, G and B video signals in a horizontal period. FIG. 3C shows a white uniformity compensation voltage in a horizontal period from the optional waveform generation device 26. FIG. 3D shows a horizontal video modulated waveform which has already been hybridized with the R, G and B video signals as shown in FIG. 3B by the dual gate FET 7. FIG. 3E shows R, G and B video signals in a vertical period. FIG. 3F shows a white uniformity compensation voltage in a vertical period from the optional waveform generation device 26. FIG. 3G shows a vertical video modulated waveform which is hybridized with the R, G and B video signals as shown in FIG. 3B by the dual gate FET 7.

Next, the operation of the signal hybrid device as the fourth embodiment of the present invention will be explained.

A brightness and a color balance of a picture displayed on the monitor 23 are detected by the camera 24. Compensation data items are generated based on the compensation data items about the color balance and the brightness of the picture from the camera 24 and transmitted to the optional waveform generation device 26. Thereby, as shown at the corner in the right side on the monitor 23 in FIG. 3A, when a result of the white uniformity compensation operation is bad, the horizontal compensation voltage and the vertical compensation voltage are generated (see FIGS. 3C and 3F).

Then, these horizontal and vertical compensation voltages are supplied to the gate G2 of the dual gate FET 7, and they are hybridized with a horizontal video signal and a vertical video signal, respectively, as shown in FIGS. 3B and 3E. As a result, the modulated video signal waveforms in the horizontal and vertical periods can be obtained as shown in FIGS. 3D and 3G, respectively.

As described above, in the signal hybrid device as the fourth embodiment, the effect that the brightness and the color balance of the picture displayed on the monitor 23 become uniform by hybridizing the modulated waveform in each of the horizontal period and the vertical period with the R, G and B video signals so that the white uniformity of the picture displayed on the monitor 23 is compensated.

As described above in detail, the signal hybrid device of the present invention comprises a first active element for receiving video signals transmitted from outside the device and a blank signal from an On Screen Display (OSD) through input terminals of the first active element, these input terminals being different and independent from to each other, a second active element for receiving a direct current (DC) control voltage from a voltage power source and the video signals from the OSD through separate input terminals of the second active element, these input terminals being different and independent from to each other, and an output means for hybridizing the outputs form the first active element and the second active element. Thereby, the signal hybrid device of the present invention has the effect that the R, G and B video signals can be hybridized with OSD video signal with high accuracy without a degradation of the high frequency characteristic of each of the R, G and B video signals.

In addition, in the signal hybrid device of the present invention, because the voltage level of the DC control voltage from the voltage power source can he changeable, the amplitude of the video signal from the OSD can be changed so that high quality pictures can be displayed on a screen such as a CRT.

Furthermore, in the signal hybrid device of the present invention, because a changeable voltage which can be changed in voltage level is supplied to the input control terminal of the second active element from the DC voltage changeable means, the DC level of the video signal can be changeable, so that high quality pictures can be displayed on a screen such as a CRT.

Moreover, in the signal hybrid device of the present invention, because a compensation data generation means generates compensation data based on the detected brightness and color balance of the picture displayed on a monitor, the compensation voltage generation means generates and supplies a white compensation voltage in a horizontal period and a vertical period to the input control terminal of the first active element to which a blank signal is provided based on the compensation data, the signal hybrid device has an effect that the white uniformity can be compensated and the brightness and color balance of the picture displayed on the monitor can be uniform.

In addition, in the signal hybrid device of the present invention, because each of the first and second active elements is made up of a dual gate FET, there is an effect that a manufacturing cost of the signal hybrid device can be decreased.

Although the present invention has been described and illustrated in detail, it is clearly understood that the same is by way of illustration and example only and is not to be taken by way of limitation, the spirit and scope of the present invention being limited only by the term of the appended claims.

What is claimed is:

1. A signal hybrid device comprising:

an On Screen Display (OSD) for generating an OSD video signal and a blank signal and for transmitting them;

a first active element having a plurality of input control terminals which are independent from each other and through which a video signal and said blank signal from said OSD are transmitted, said first active element for hybridizing said video signal with said blank signal;

a voltage power source for generating a direct current (DC) control voltage and supplying said DC control voltage;

a second active element having a plurality of input control terminals which are independent from each other and through which said DC control voltage from said voltage power source and said OSD video signal from said OSD are transmitted, said second active element for hybridizing said DC control voltage with said OSD video signal; and output means for receiving and transmitting said hybrid signals hybridized by said first active element and said second active element.

2. A signal hybrid device as claimed in claim 1, wherein said voltage power source generates said DC control voltage whose voltage level is changeable.

3. A signal hybrid device as claimed in claim 1, further comprises a direct current voltage supply means for supplying a changeable direct current voltage having an optional voltage level to said input control terminals of said second active element.

4. A signal hybrid device as claimed in claim 1, further comprises:

detection means for detecting a brightness and a color balance of a picture displayed on a monitor which receives said hybrid signal from said output means and displays said received hybrid signal;

compensation data generation means for generating compensation data based on said brightness and the color balance of the picture detected by said detection means; and compensation voltage generation means for generating white uniformity compensation voltages in a horizontal period and a vertical period based on said compensation data and for supplying said white uniformity compensation voltages to said input control terminal of said first active element.

5. A signal hybrid device as claimed in claim 1, wherein each of said first active element and said second active element includes a dual gate field effect transistor.

6. A signal hybrid device as claimed in claim 1, wherein said voltage power source is a digital-to-analogue converter.

* * * * *